United States Patent [19]

Gürtler

[11] Patent Number: 5,364,714
[45] Date of Patent: Nov. 15, 1994

[54] TERMINAL POST FOR A STORAGE BATTERY

[75] Inventor: Josef Gürtler, Bad Sassendorf, Germany

[73] Assignee: Hagen Batterie AG, Soest, Germany

[21] Appl. No.: 44,291

[22] Filed: Apr. 7, 1993

[30] Foreign Application Priority Data

Apr. 8, 1992 [DE] Germany .............................. 4212214

[51] Int. Cl.⁵ .............................................. H01M 2/3
[52] U.S. Cl. .................................................. 429/178
[58] Field of Search ............ 429/178, 179; H01M 2/3

[56] References Cited

U.S. PATENT DOCUMENTS 4,389,471 6/1983 Woodhouse ...................... 429/178
5,077,892 1/1992 Nugent .

Primary Examiner—John S. Maples
Attorney, Agent, or Firm—Salter & Michaelson

[57] ABSTRACT

The invention concerns an electrolyte-tight terminal post which extends through the cover of a storage battery. The invention more particularly concerns the labyrinth seal between the terminal post and the plastic of the battery cover. It is proposed to design the foot region of the terminal post as a flange which extends radially outward, whereby ribs extend outwardly from the flange substantially parallel to the terminal-post axis.

2 Claims, 1 Drawing Sheet

TERMINAL POST FOR A STORAGE BATTERY

BACKGROUND AND SUMMARY OF THE INVENTION

The invention concerns the formation of a terminal post for a storage battery.

Terminal posts of storage batteries, which are guided through the cover of the battery housing to the outside must be sealed in an electrolyte-tight manner against the cover, so that e.g., sulfuric acid, which is very active in a capillary sense, cannot leak to the outside in the case of lead batteries. Because of its capillary-active properties, sulfuric acid can penetrate through even the finest gaps and hair-line cracks.

Terminal posts are used for the execution of the electrical terminals of a battery through the battery cover, and these terminal posts are incorporated in the injection molding of the battery cover consisting of plastic. The electrical terminals are then later inserted into the terminal posts in the final assembly of the batteries. The following must be distinguished: 1) the sealing of the terminal posts against the battery cover, and 2) the sealing of the electrical terminals against the terminal posts. The instant invention concerns exclusively the domain of electrolyte-tight sealing between the terminal posts and the cover of storage batteries.

The use of rubber gaskets or sealing compounds based on a casting resin, fusion (melting) adhesive or the like is known for this purpose, but these are relatively expensive, and they may age or become loose due to mechanical defects during the period of use.

In practice, therefore, terminal posts have been used in recent years, which have in their foot region annular encircling ribs radially extending to the outside. These ribs form a so-called labyrinth seal in the cover during the manufacture of the cover from plastic.

However, even labyrinth seals of this type involve considerable problems, as has been described in detail in the recently published U.S. Pat. No. 5,077,892.

There is a problem in shaping the ribs on the outside in the foot region of the terminal posts. In lead batteries which are presently most commonly used, the terminal posts are cast from lead or cold compression molded from lead. In both cases, a two-part mold must be used, whose dividing plane lies in the plane of the axis of the terminal post, since, if it were positioned otherwise, the ribs which extend radially from the axis of the terminal post could not be removed from the mold.

This plane of division of the mold causes difficulties, since the terminal post removed from the mold still has a more or less intensely formed metal flash. If this flash is not carefully removed (which involves the corresponding costs), the ribs are not sufficiently tightly surrounded by the plastic mass in this region during the injection molding of the plastic cover, and thus hair-line gaps may be present in the labyrinth seal joining of the terminal post and the cover, by which means the electrolyte can leak from the battery.

A means for avoiding the undesired formation of flash on the labyrinth ribs is described in the already known U.S. Pat. No. 5,077,892. This means requires first of all, the manufacture of a homogeneous rod material from lead, which is then cut corresponding to the desired length of the terminal posts and then is processed in a lathe in order to produce the annular ribs free of flash and encircling in an annular manner the outside of the terminal posts. Of course, this is a very expensive means, in which a large mass production of terminal posts is not economical.

The task of the present invention is to seek a means for solving this problem by another cost-favorable means.

This task is resolved according to the invention, in that the foot region of the terminal post has a flange, which extends radially outward from the axis of the terminal post and that the ribs extending outwardly from the flange extend substantially parallel to the axis of the terminal post.

It is advantageous to provide the flange of the terminal post with ribs on its lower side as well as on its upper side.

Basic advantages are obtained by the new design of the labyrinth seal by means of the flange and the ribs extending therefrom.

First, it is an advantage that the new design of the labyrinth seal can be manufactured by mold (finished) casting or compression molding of the terminal posts, since this is a common process for large mass production and is the most cost-favorable.

A second advantage is produced by the fact that the new design of the labyrinth seal requires correspondingly other planes of division of the mold. The planes of division must now be arranged such that the radially extending flange with ribs extending parallel to the axis of the terminal post can be removed from the mold. Correspondingly, the plane of division is always selected such that the flange lies in its radial extent completely in the dividing plane, so that metal flash, which can form during casting or compression molding of the terminal post in the dividing plane can arise only on the outer diameter of the flange and in fact also only with radial extension to the outside.

It is appropriate to select the arrangement of the dividing plane such that it perpendicularly intersects the axis of the terminal post and is arranged at the level of the maximum outer diameter of the flange.

The flash extending radially outward on the outer edge or the maximum outer diameter of the flange is not a disadvantage with respect to the tightness of the labyrinth seal. The contrary is the case. It causes an increase in the theoretical length of the labyrinth path, through which an electrolyte must pass on its way from inside to outside. The effectiveness of the labyrinth seal is improved in this way. In the same way, it is acceptable in the terminal posts of the invention that metal flash is present on the outer periphery of the flange.

A third advantage results from the fact that the labyrinth seal of the new terminal post requires only a small height for incorporation in the battery cover (measured in the axial direction of the terminal post). In this way, the foot region of the terminal post does not extend very far into the inside space of the storage battery. The inside space of the storage battery can be better utilized by electrode plates which are incorporated at a higher level.

BRIEF DESCRIPTION OF THE DRAWINGS

The preferred embodiment of the invention will be described in detail in the following on the basis of a drawing wherein.

DESCRIPTION OF THE PREFERRED EMBODIMENT

Figure 1:
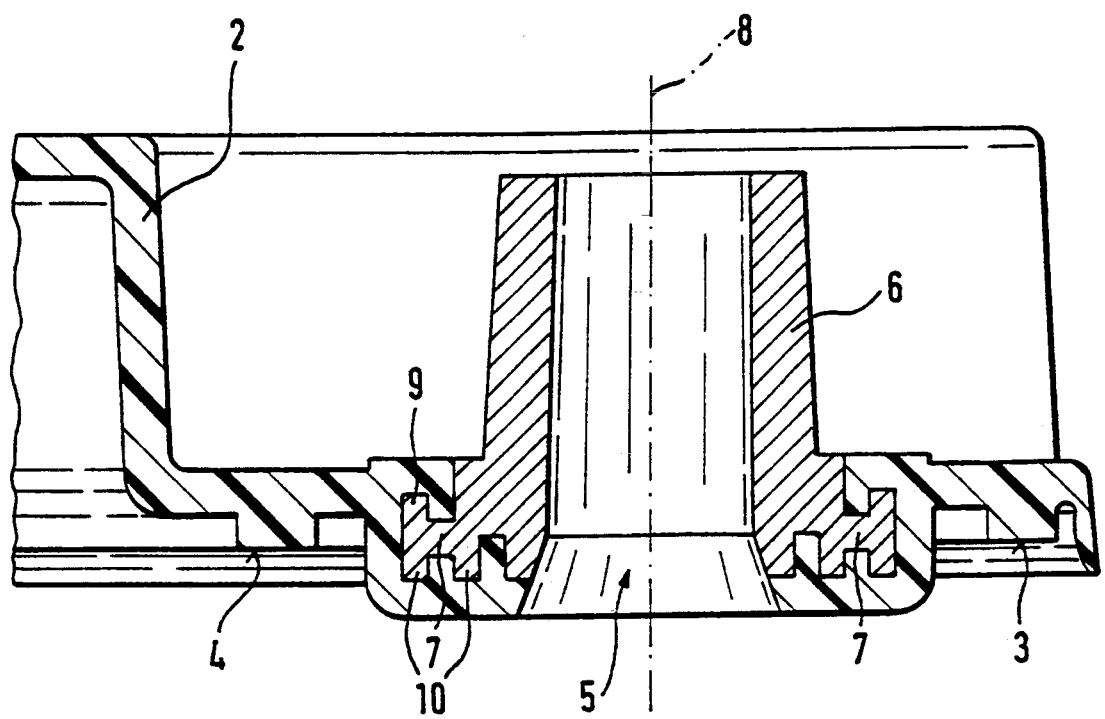
FIG. 1 shows a cross-sectional view of the terminal post of the invention.

The battery cover 2 shown in partial section is made of plastic and is placed tightly onto a battery container (not shown) by its tight sealing surfaces 3 and 4 in the ready-to-use battery. The distance between tight surfaces 3 and 4 corresponds to the width of the battery.

Battery cover 2 projects only slightly downward into the inside space of the battery by means of the foot region of terminal post 6. The electrical terminal (not shown) is later incorporated in a final mounting of the batteries in the inner cone 5 of terminal post 6.

A flange 7 is present on the foot region of terminal post 6, which extends radially outward. Shaped ribs 9 and 10 are formed on the lower side and the upper side of this flange 7. The ribs extend substantially parallel to axis 8 of the terminal post 6.

The foot region of terminal post 6 is placed in the mold with the cover for the production of cover 2 and is embedded completely in the material of the battery cover as can be seen from the drawing.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A terminal post for a storage battery comprising:
    a body portion having a foot region and a longitudinal axis;
    a flange which extends radially outwardly from the foot region substantially perpendicular to the axis of the terminal post, said flange having upper and lower sides; and
    a plurality of ribs which project outwardly from both the upper and lower sides of the flange substantially parallel to the axis of the terminal post.

2. A terminal post for a storage battery comprising:
    a body portion having a foot region and a longitudinal axis;
    a flange which extends radially outwardly from the foot region substantially perpendicular to the axis of the terminal post, said flange having upper and lower sides, said flange being completely embedded in a battery cover; and
    a plurality of ribs which project outwardly from both the upper and lower sides of the flange substantially parallel to the axis of the terminal post, said ribs forming an electrolyte-tight seal with said battery cover.

* * * * *